(12) United States Patent
Blake

(10) Patent No.: US 7,461,870 B2
(45) Date of Patent: Dec. 9, 2008

(54) CONNECTOR FOR FLEXIBLE ELECTRICAL CONDUIT

(75) Inventor: Geoffrey Blake, Sharon, MA (US)

(73) Assignee: IBC Corporation, South Easton, MA (US)

( * ) Notice: Subject to any disclaimer, the term of this patent is extended or adjusted under 35 U.S.C. 154(b) by 84 days.

(21) Appl. No.: 11/165,571

(22) Filed: Jun. 23, 2005

(65) Prior Publication Data

US 2006/0000631 A1   Jan. 5, 2006

Related U.S. Application Data

(60) Provisional application No. 60/582,266, filed on Jun. 23, 2004.

(51) Int. Cl.
*F16L 11/118* (2006.01)
(52) U.S. Cl. .............. 285/149.1; 174/58; 174/481; 439/535; 403/238; 24/457
(58) Field of Classification Search .............. 285/149.1, 285/150.1, 151.1, 152.1, 153.1, 153.2, 153.3, 285/154.1, 154.2, 154.3, 154.4; 174/50, 174/53, 58, 481, 660–661; 439/535–538; 248/56; 403/238, 243; 24/457–458
See application file for complete search history.

(56) References Cited

U.S. PATENT DOCUMENTS

| | | | | |
|---|---|---|---|---|
| 4,012,578 A | * | 3/1977 | Moran et al. ................. 174/51 |
| 4,990,721 A | * | 2/1991 | Sheehan ..................... 174/660 |
| 5,068,496 A | | 11/1991 | Favalora .................... 174/65 R |
| 5,204,499 A | | 4/1993 | Favalora .................... 174/65 R |
| 5,346,264 A | | 9/1994 | Law et al. ..................... 285/158 |
| 5,567,074 A | | 10/1996 | Dovak et al. ................. 403/197 |
| 5,728,971 A | | 3/1998 | Nash ....................... 174/50.52 |
| 5,731,543 A | | 3/1998 | Jorgensen ................. 174/65 R |
| 6,020,557 A | | 2/2000 | Jorgensen ................. 174/65 R |
| 6,034,326 A | | 3/2000 | Jorgensen ................. 174/65 R |
| 6,082,782 A | | 7/2000 | Bartholoma et al. ..... 285/140.1 |
| 6,114,630 A | | 9/2000 | Gretz ....................... 174/65 R |
| 6,380,483 B1 | | 4/2002 | Blake ....................... 174/65 R |
| 6,635,822 B2 | | 10/2003 | Krupa, Jr. ..................... 174/58 |

\* cited by examiner

*Primary Examiner*—Aaron M Dunwoody
*Assistant Examiner*—Fannie Kee
(74) *Attorney, Agent, or Firm*—Grossman, Tucker, Perreault & Pfleger, PLLC

(57) ABSTRACT

A one piece connector is provided for coupling a flexible conduit to junction boxes having different wall thicknesses. The connector includes a bottom defining an aperture for passing electrical conductor therethrough. The connector further includes a sidewall extending upwardly from the bottom, and a member projecting inwardly from the sidewall for engaging the flexible conduit. The connector also includes a locking tab member having an outwardly extending tab, an outwardly angled locking protrusion, and a locking arm having an outwardly angled region and an inwardly angled region for retaining the connector within an opening in a junction box.

20 Claims, 3 Drawing Sheets

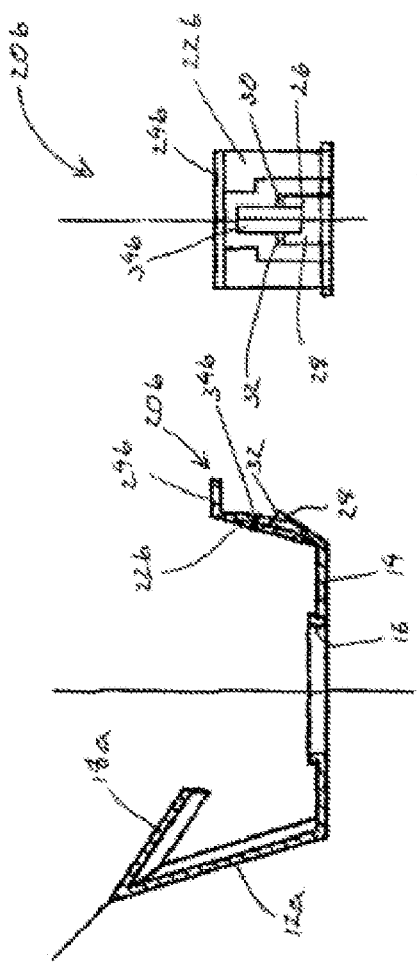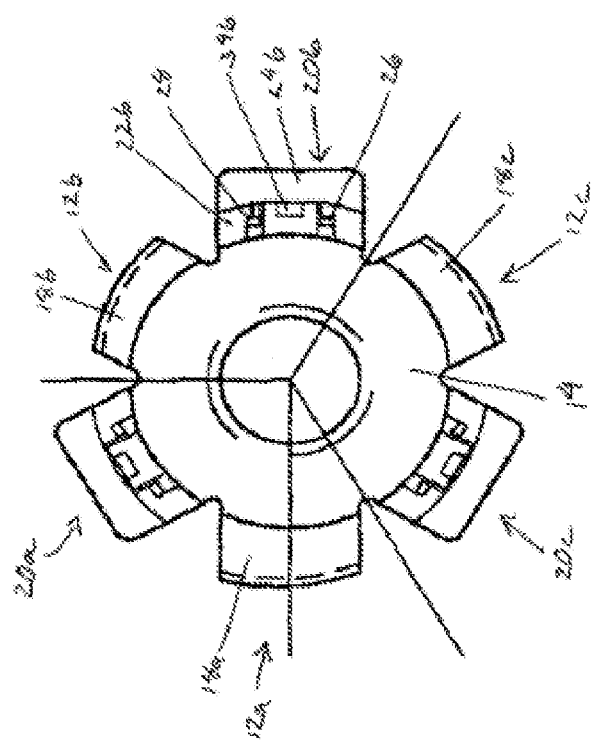

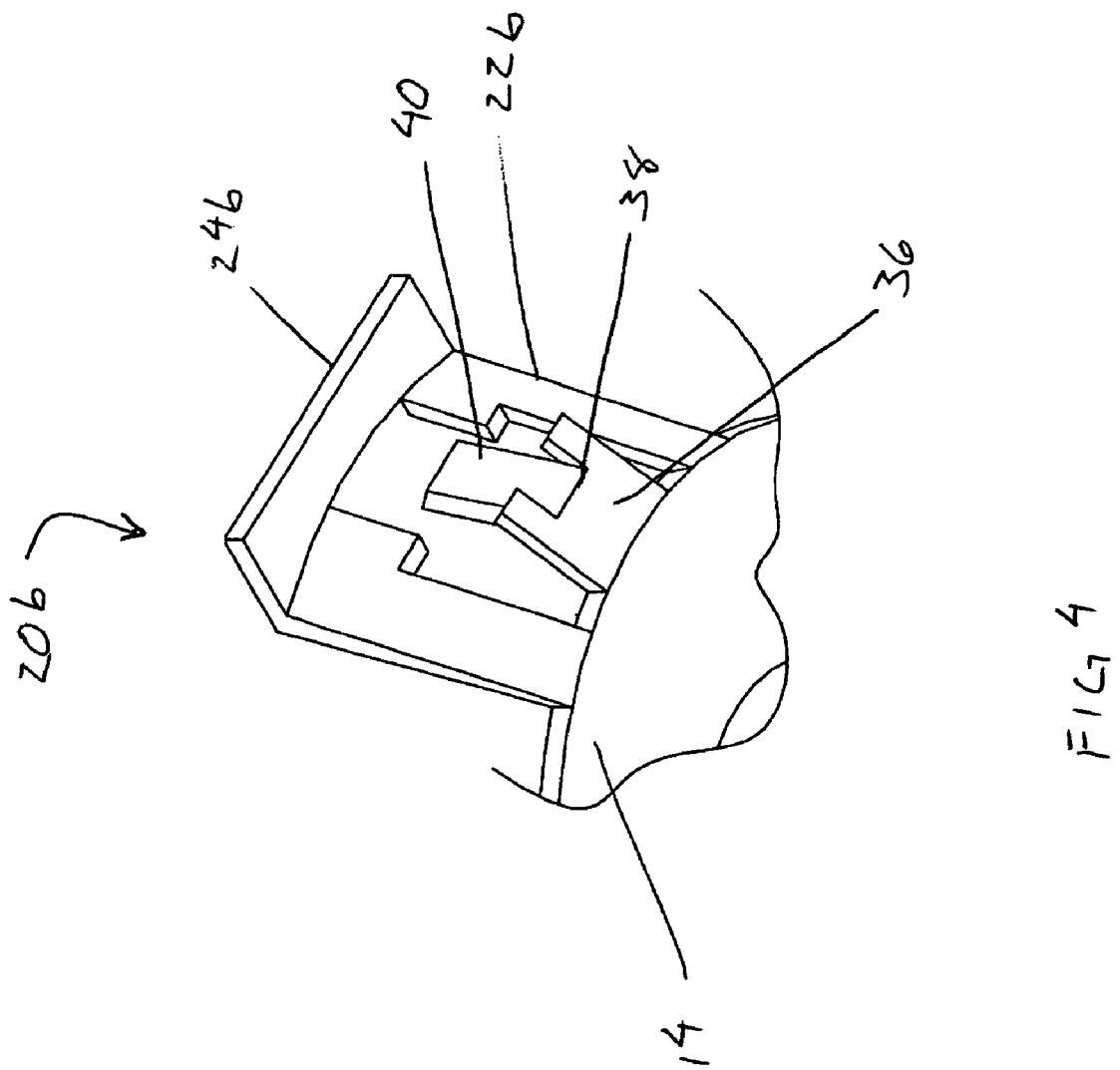

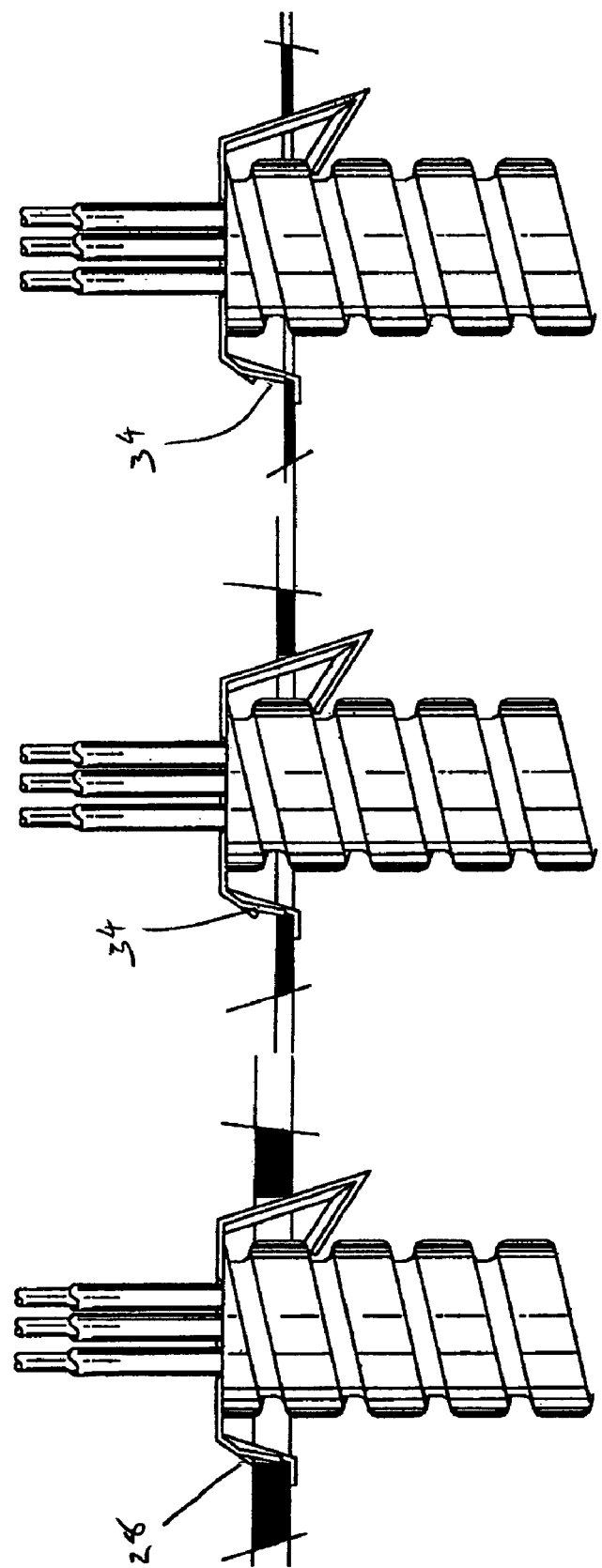

CONNECTOR FOR FLEXIBLE ELECTRICAL CONDUIT

CROSS-REFERENCE TO RELATED APPLICATIONS

This application claims the benefit of U.S. provisional patent application Ser. No. 60/582,266, filed on Jun. 23, 2004, the entire disclosure of which is incorporated herein by reference.

FIELD

The present disclosure relates to connectors for securing flexible electrical conduit to housings, such as junction boxes, fixtures, and the like.

BACKGROUND

Flexible electrical conduit is frequently used in residential and commercial wiring in order to satisfy building codes, and because of the versatility imparted by the flexible nature of the conduit. All of the wiring typically originates at a central fuse box, or junction box, and may terminate at, or pass through, a variety of fixtures or other various housings requiring electrical connections. In order to prevent the wire from being pulled free at any of these locations, the electrical conduit may be secured to the junction box and any fixture along the way.

The problem of securely fastening flexible electrical conduit in a junction box has been solved in several ways in the past. One such solution involves die cast sleeves which are threaded into the opening in the junction box and then secured by a locking nut. Conduit is then fed through the sleeves and clamped by screw-tightening a bar assembly to bear upon the inserted conduit. While this method serves the ultimate purpose of holding the electrical conduit in the junction box, it has several drawbacks.

Connectors involving die cast sleeve assemblies typically have several separate subparts which are manufactured and then loosely assembled and sold as a connector unit. Individual assembled units must then be dissembled for installation at the worksite. Such a complicated manufacturing and installation technique is very expensive and time-consuming. Also, junction boxes of the type in which the connectors of the present invention are designed for use are often located in out-of-the-way places to which access is limited. Die cast sleeve assemblies have proven difficult to use where needed because the numerous small parts require ample space and a dexterous hand to assemble and fix in position in the junction box. Finally, die cast assemblies by their very nature tend to be somewhat weighty and costly.

BRIEF DESCRIPTION OF DRAWINGS

Features and advantages of connectors according to the present invention are set forth by way of description of specific embodiments, which description should be considered in conjunction with the accompanying drawings, wherein:

FIG. 1 is a top view of an embodiment of a connector consistent with the present disclosure;

FIG. 2 is a cross-sectional view of the connector illustrated in FIG. 1;

FIG. 3 is a side view of a locking tab member of the connector of FIGS. 1 and 2;

FIG. 4 is a perspective view of a locking tab member of the connector of FIGS. 1 and 2;

FIG. 5 is a schematic view of a connector consistent with the present disclosure engaged with a junction box having a relatively thick wall;

FIG. 6 is a schematic view of a connector consistent with the present disclosure engaged with a junction box having an intermediate wall thickness; and FIG. 7 is a schematic view of a connector consistent with the present disclosure engaged with a junction box having a relatively thin wall.

DESCRIPTION

The one-piece flexible conduit connector according to this disclosure may be made of relatively resilient metal formed into a thimble having a generally frusto-conical shape and having members projecting inwardly from certain areas of the walls thereof to engage a flexible conduit sheath. The conduit sheath may be of the variety including a helical groove. The conduit sheath may be threaded or pressed into the connector which in turn may be inserted in an opening in a junction box or other fixture.

Referring to the drawings, an embodiment of a connector 10 consistent with the present disclosure is shown in a variety of views. As best shown in the cross-sectional view of FIG. 2 the connector 10 may include a sidewall 12a-12c extending upwardly from a bottom 14. The sidewall 12a- 12c may be provided as a continuous wall, or, as shown, may be formed as a plurality of individual sidewall members 12a-12c extending upwardly from the bottom 14, as best seen in the top view of FIG. 1. Accordingly, when a flexible conduit is inserted into the connector 10, either by threading or by pressing, the conduit may be at least partially surrounded by the sidewall members 12a- 12c and an end of the conduit may bear against the bottom 14 of the connector 10. The bottom 14 of the connector 10 may include an aperture 16 to permit conductors extending through the conduit to pass through the bottom 14 of the connector 10 and into a junction box, fixture, etc. As shown, the aperture 16 may include a rolled edge to reduce the likelihood of damage to insulators of the conductors carried by the conduit, which may result from a sharp edge defining the aperture 16. As discussed above, the connector 10 may include one or more inwardly projecting members 18a-18c that may engage the flexible sheath of the conduit and retain the conduit in the connector. In the case of a helical flexible conduit, the inwardly projecting members 18a- 18c may engage a helical groove in the conduit.

The connector 10 may also include one or more sets of locking tab members 20a-20c extending upwardly from the bottom 14 of the connector 10. With further reference to FIG. 3, which shows only the locking tab member 20b in side view, the locking tabs 20a-20c may include a wall portion 22a-22c that may, in conjunction with the sidewall members 12a-12c define the frusto-conical shape of the connector 10. One or more of the locking tab members 20a-20c may include outwardly extending tabs 24a-24c. When the connector 10 is inserted into an opening in a junction box, etc., the outwardly extending tabs 24a-24c may bear against the junction box about at least a portion of the periphery of the opening to prevent over insertion of the connector 10.

Consistent with the present disclosure, the connector 10 may be adapted to provide secured engagement to junction boxes having various wall thicknesses. For the purpose of clarity, description is made by reference to the locking tab member 20b and the features thereof. It should be understood that each set of locking tab members 20a-20c may be configured generally the same as the locking tab members 20b. Secure engagement to junction boxes of various thicknesses may be achieved by providing each locking tab member 20a-20c with at least one locking protrusion 26, 28 and at least one locking arm 34. A first set of resiliently deflectable locking protrusions 26, 28 may be provided for engaging a junction box having a relatively thick wall. As shown in FIG. 2, the first set of locking protrusions 26, 28 may be angled outwardly from the wall portion 22b and may extend toward the outwardly extending tab 24b. The end 30, 32 of each of the first set of locking protrusions 26, 28 may generally be spaced from an adjacent side of the outwardly extending tab 24b by a distance generally equal to the thickness of a relatively thick junction box wall, i.e., a maximum design thickness. Consistent with one embodiment, the distance between the ends 30, 32 of the first set of locking protrusions 26, 28 and the outwardly extending tab 24b may generally be about 0.125 inches to accommodate the thickest conventional junction box wall. However, the spacing may be larger or smaller to accommodate different desired maximum junction box wall thicknesses. Therefore, the dimension between the end 30, 32 of the first set of locking protrusions and the outwardly extending tab 24b, i.e., the maximum design thickness, should not be construed as limiting.

In use, the connector 10 may be installed in a junction box by pressing the connector 10 into an opening in the junction box. As the connector 10 is pressed into the opening in the junction box the first set of locking protrusions 26, 28 may resiliently deflect inwardly, thereby allowing the connector 10 to be seated in the opening such that the outwardly extending tab 24b may bear against the junction box around the periphery of the opening. As the locking protrusions 26, 28 are pressed through the opening in the junction box the locking protrusions 26, 28 may resiliently recover to an outwardly angled configuration, as shown in FIG. 5. The outwardly angled configuration of the locking protrusions 26, 28 may prevent the connector 10 from being withdrawn from the opening in the junction box. For a junction box wall thickness at, or just below, the maximum design thickness, when the locking protrusions 26, 28 resiliently recover after being inserted through an opening in the junction box the ends 30, 32 of the locking protrusions 26, 28 may bear against, or be adjacent to, an interior wall of the junction box at the periphery of the opening and the outwardly extending tab 24b may bear against an exterior wall of the junction box at the periphery of the opening. As such, the connector 10 may be securely engaged with the junction box.

In a case in which the junction box wall thickness is relatively thin compared to the maximum design thickness the connector 10 may only be loosely engaged with the junction box, i.e., the connector 10 may wobble and/or experience some slop or freedom of movement as a result of the clearance between the ends 30, 32 of the locking protrusions 26, 28 and the inside wall of the junction box when the outwardly extending tab 24b is positioned against an exterior of the junction box. In order to achieve secure engagement with a junction boxes having a wall thickness less than the maximum design thickness one, or all, of the locking tab members 20a-20c of the connector 10 may be provided having a resiliently deflectable locking arm 34a-34b.

FIG. 4 is a perspective view of a locking tab member 20b showing the resilient locking arm 34b. Consistent with the illustrated embodiment, the resilient locking arm 34b may generally include an outwardly angled diverging region 36 adjacent the bottom 14 of the connector 10. The locking arm 34b may also include an inwardly angled converging region 40 adjacent the outwardly extending tab 24b. The diverging region 36 and the converging region 40 may join at an apex 38 of the locking arm. According to one embodiment, the apex 38 of the locking arm may be located a distance from the outwardly extending tab 24b that is generally equal to the maximum design thickness of the connector. According to another embodiment, the apex 38 may be located a distance from the outwardly extending tab 24b that is less than the maximum design thickness. According to still another embodiment, the apex 38 may be located a distance from the outwardly extending tab 24b that is greater than the maximum design thickness, as shown in the illustrated embodiment. Consistent with the illustrated embodiment, the locking arm 34b may extend from a position adjacent the bottom 14 of the connector 10, or may extend from a position adjacent the outwardly extending tab 24b of the locking tab member 20b.

According to one aspect, the angle of the converging region 40, the distance the apex 38 extends from the sidewall portion 22b and distance from the outwardly extending tab 24b that the converging region 40 begins may all be adjusted to accommodate a minimum junction box wall thickness. Consistent with one embodiment, the attributes of the converging region 40 of the locking arm 34b may be adapted to accommodate a junction box having a wall thickness of 0.030 inches which corresponds to the thinnest conventionally available junction box wall thickness. However, the attributes of the resilient locking arm 34b may be adapted to accommodate a thicker or a thinner minimum wall thickness. Therefore, a configuration adapted to accommodate a specific minimum junction box wall thickness should not be construed as limiting.

While the diverging region 36, converging region 40 and apex 38 have been illustrated and described as angled, linear regions, it should be understood that one or all of these features may have an arcuate configuration. Additionally, while each locking tab member 20a-20c is shown including a single centrally positioned locking arm 34 disposed between two locking protrusions 26, 28, the number and relative arrangement of locking arms 34 and locking protrusions 26, 28 may be varied within the scope of the present disclosure.

When a connector 10 consistent with the present disclosure is inserted into an opening in a junction box the locking arm 34, as well as the locking protrusions 26, 28, resiliently deflects inwardly to pass through the opening. Once the apex 38 of the locking arm 34 clears the opening, i.e., passes through to the inside of the opening in the junction box, the locking arm 34 may resiliently recover to an outwardly extended configuration. As the locking arm 34 resiliently recovers to an outwardly extended configuration, the converging region 40 of the locking arm 34b may bear against the inside wall of the junction box and/or the inside edge of the opening in the junction box. The inward incline of the converging region 40 of locking arm 34b toward the wall 22b adjacent the outwardly extending tab 24b bearing against the inside wall of the junction box and/or the inside edge of the opening in the junction box may tend to pull the connector 10 further into the opening in the junction box such that the outwardly extending tab 24b may bear against the outside of the junction box wall around the periphery of the opening. As shown in FIG. 7, in the case of a relatively thin junction box wall, the locking arm 34b may resiliently recover to a position outside of the opening, and thereby prevent withdrawal of the connector 10 from the opening. In the case of a junction box having an intermediate wall thickness the end of the locking arm 34b may remain within the opening in the junction box. If a removing force is applied to the connector 10 the end of the locking arm 34b may bite into the junction box wall inside the opening and thereby resist extraction of the connector 10 from the junction box opening.

In addition to providing secure engagement with junction boxes having different wall thicknesses, a connector 10 consistent with the present disclosure may also provide resistance against pull-out. In an application in which the connector 10 is engaged with a junction by the locking arm 34 bearing against the inside of a junction box wall or the inside edge of an opening in a junction box, a strong extraction force applied to the connector 10, e.g., applied to the connector 10 through a conduit engaged with the connector 10, may be sufficient to over-come the spring force of the locking arm 34 and may compress the locking arm inwardly and allow the connector 10 to be at least partially extracted form the opening in the junction box. However, as the connector 10 is extracted from the junction box the ends 30, 32 of the locking protrusions 26, 28 may be caused to bear against the inside of the junction box wall, thereby preventing complete extraction of the connector 10 from the junction box. Complete extraction of the connector 10 from the junction box may require deforming, breaking, etc. the locking protrusions 26, 28. Accordingly, a connector consistent with the present disclosure may be provided that is capable of resisting pull-out forces up to, and exceeding, 75 pounds.

The invention herein has been set forth by way of description of embodiments consistent therewith. The described embodiments are susceptible to numerous modifications and variations without departing from the invention herein, and should therefore not be construed as limiting the invention.

What is claimed is:

1. A connector for flexible conduit comprising:
   a bottom defining an aperture;
   a sidewall extending upwardly from said bottom, said sidewall defining a frusto-conical shape;
   at least one member projecting inwardly from said sidewall; and
   at least one locking tab member extending upwardly from said bottom, said at least one locking tab member comprising a wall portion and an outwardly extending tab extending from said wall portion, a first and at least a second outwardly angled locking protrusion angled outwardly from said wall portion and extending towards and spaced from said outwardly extending tab, and at least one locking arm located between said first and said at least a second outwardly angled locking protrusion comprising an outwardly angled region adjacent said bottom and extending generally away from said bottom and outwardly relative to said wall portion and an inwardly angled region extending generally from said outwardly angled region away from said bottom and generally inwardly relative to said outwardly angled region and towards said outwardly extending tab.

2. The connector of claim 1, wherein said aperture in said bottom comprises a rolled edge.

3. The connector of claim 1, wherein said sidewall comprises a plurality of individual sidewall members disposed about a periphery of said bottom and extending upwardly from said bottom.

4. The connector of claim 1, wherein said at least one member projecting inwardly from said sidewall is configured to engage at least a portion of a flexible sheath of a conduit and retain said conduit in said connector.

5. The connector of claim 4, wherein said at least one member projecting inwardly from said sidewall extends generally inwardly from a distal end of said sidewall and generally towards said bottom.

6. The connector of claim 1, wherein said connector comprises a plurality of locking tab members disposed about said bottom.

7. The connector of claim 1, wherein said wall portion of said at least one locking tab member defines, in conjunction with said sidewall, said frusto-conical shape of said connector.

8. The connector of claim 1, wherein said at least one locking tab member comprises a plurality of outwardly extending tabs configured to bear against a junction box about at least a portion of a periphery of an opening of said junction box to prevent over insertion of said connector into said junction box.

9. The connector of claim 1, wherein said first and said at least a second outwardly angled locking protrusions are configured to resiliently deflect inwardly toward said at least one locking tab member.

10. The connector of claim 1, wherein at least one of said first and said at least a second angled locking protrusions comprise an end portion configured to be spaced about 0.125 inches from an adjacent side of said outwardly extending tab.

11. The connector of claim 1, wherein said at least one locking arm is resiliently coupled to said at least one locking tab member.

12. The connector of claim 1, wherein said outwardly angled region and said inwardly angled region join at an apex of said at least one locking arm.

13. The connector of claim 12, wherein at least a portion of said connector is received in an opening in a junction box, and wherein said apex is located at a distance from said outwardly extending tab that is generally equal to a thickness of said junction box.

14. The connector of claim 12, wherein at least a portion of said connector is received in an opening in a junction box, and wherein said apex is located at a distance from said outwardly extending tab that is generally less than a thickness of said junction box.

15. The connector of claim 12, wherein at least a portion of said connector is received in an opening in a junction box, and wherein said apex is located at a distance from said outwardly extending tab that is generally greater than a thickness of said junction box.

16. The connector of claim 1, wherein said at least one locking arm extends from a position adjacent said outwardly extending tab.

17. The connector of claim 1, wherein said at least one locking arm extends from a position adjacent said bottom.

18. The connector of claim 1, wherein said outwardly extending tab is disposed proximate a distal end of said at least one locking tab member.

19. A connector for securing a flexible conduit to a junction box comprising:
   a bottom defining an aperture;
   a sidewall extending upwardly from said bottom, said sidewall including at least one member projecting inwardly generally toward said bottom configured to engage at least a portion of a sheath of said flexible conduit and retain said flexible conduit in said connector; and
   at least one locking tab member extending upwardly from said bottom, said at least one locking tab member comprising:
      a wall portion that, in conjunction with said sidewall, defines a frusto-conical shape of said connector;
      an outwardly extending tab extending generally outwardly from a distal end of said wall portion and configured to engage at least a portion of a periphery of an opening of said junction box to prevent over insertion of the connector;
      a first and a second outwardly angled locking protrusion angled outwardly from said wall portion and extending towards and spaced from said outwardly extending tab, said first and said second outwardly angled locking protrusions configured to resiliently deflect inwardly toward said at least one locking tab member; and at least one resilient locking arm centrally located between said first and said second outwardly angled locking protrusion, said at least one resilient locking arm comprising an outwardly angled region adjacent said bottom and extending generally away from said bottom and outwardly relative to said wall portion and an inwardly angled region extending generally from said outwardly angled region away from said bottom and generally inwardly relative to said outwardly angled region and towards said outwardly extending tab.

20. The connector of claim 19, wherein said outwardly angled region and said inwardly angled region join at an apex of said at least one locking arm.

* * * * *